(12) United States Patent
Meyers

(10) Patent No.: US 7,290,753 B2
(45) Date of Patent: Nov. 6, 2007

(54) TORQUE SENSITIVE DIAPHRAGM VALVE

(76) Inventor: Scott Christopher Meyers, 207 W. 10th St., Apt. 2D, New York, NY (US) 10014

( * ) Notice: Subject to any disclaimer, the term of this patent is extended or adjusted under 35 U.S.C. 154(b) by 0 days.

(21) Appl. No.: 11/224,359

(22) Filed: Sep. 12, 2005

(65) Prior Publication Data

US 2006/0006357 A1   Jan. 12, 2006

Related U.S. Application Data

(63) Continuation of application No. 10/713,832, filed on Nov. 17, 2003, now Pat. No. 7,004,447.

(51) Int. Cl.
*F16K 31/44* (2006.01)
(52) U.S. Cl. .......................... 251/81; 251/77; 251/273; 251/331
(58) Field of Classification Search ............ 251/81, 251/77, 335.1, 79, 335.2, 264, 331; 92/96, 92/98 R
See application file for complete search history.

(56) References Cited

U.S. PATENT DOCUMENTS

| | | | |
|---|---|---|---|
| 2,725,211 A | 11/1955 | Boteler | |
| 2,895,708 A | 7/1959 | Ludovico | |
| 3,091,427 A | 5/1963 | Boteler | |
| 3,827,670 A * | 8/1974 | Saarem | 251/81 |
| 5,953,965 A | 9/1999 | Kaneyama et al. | |
| 6,047,953 A | 4/2000 | Jacob, Jr. | |
| 6,196,523 B1 | 3/2001 | Miyata et al. | |
| 6,241,213 B1 | 6/2001 | Butler | |
| 6,575,431 B2 | 6/2003 | Artsvelyan | |
| 2001/0027133 A1 | 10/2001 | Kimura et al. | |
| 2003/0078106 A1 | 4/2003 | Carstensen et al. | |
| 2003/0081986 A1 | 5/2003 | Gordon | |
| 2003/0155546 A1 | 8/2003 | Browne et al. | |

* cited by examiner

*Primary Examiner*—J. Casimer Jacyna
(74) *Attorney, Agent, or Firm*—Medlen & Carroll, LLP

(57) ABSTRACT

This invention relates to pressure torque sanitary diaphragm valves and methods of using torque sensitive sanitary valves in the production of chemical and biological therapeutics to obtain procedural reproducibility in the production pharmaceutical compounds and intermediates related thereto.

2 Claims, 4 Drawing Sheets

TORQUE SENSITIVE DIAPHRAGM VALVE

This application is a continuation of prior application Ser. No. 10/713,832, filed Nov. 17, 2003 now U.S. Pat. No. 7,004,447

FIELD OF THE INVENTION

This invention relates to pressure torque sanitary diaphragm valves and methods of using torque sensitive sanitary valves in the production of chemical and biological therapeutics to obtain procedural reproducibility in the production pharmaceutical compounds and intermediates related thereto.

BACKGROUND OF THE INVENTION

Pharmaceutical products are significant portion of the national economy, and the process used by pharmaceutical companies to produce these products are regulated by the Food and Drug Administration (FDA). The Division of Manufacturing and Product Quality requires Good Manufacturing Practice for the production of human use pharmaceuticals. The FDA regulates the production of pharmaceuticals to ensure that the methods utilized produce a pharmaceutical products are of high quality and provides Certificates of Pharmaceutical Products to firms that legally market drug products.

The production of medicines requires the utilization of mechanical methods for manipulation of solid and fluid chemical compounds and mixtures. More specifically the transfer of chemical and biological solutions and mixtures will require the use of equipment that is able to be thoroughly cleaned and sanitized preventing contamination of in subsequent use. Improperly sanitizing equipment can result in contamination of the products produced in subsequent batches adding considerable cost. Steam sterilization is currently a preferred method of sanitizing equipment used in pharmaceutical manufacturing. Valves are of significant importance as equipment used in pharmaceutical manufacturing because they are often used to control the flow and transfer of chemicals including biologics and biological organisms.

Because in ordinary valves closing the valve causes the valve's stem to protrude into the flow area and opening the valve causes the stem to retract into the stem's housing area, often chemicals that are in the flow area may get trapped between the middle of the stem and the stem's housing area. The trapped chemicals are often difficult to remove during a sanitizing process allowing the trapped chemicals to be reintroduced into the flow area when the valve is subsequently used.

To overcome sanitation problems in using ordinary valves for the production of pharmaceutical and biological products, sanitary diaphragm valves have been developed. In a sanitary diaphragm valves a diaphragm is introduced between the stem and the flow area. The diaphragm is a flexible material that has a chemical contact side and a stem contact side. During rotation of the handle, the stem contacts the diaphragm pushing the diaphragm's chemical contact side into the flow area forming a seal with the surrounding flow housing area obstructing the flow of solutions. Sanitary diaphragm valves are widely used in the pharmaceutical and biotechnology industries for the processing of therapeutic and biological medicines. These valves have the feature that the diaphragm's chemical contact surface can be steam sterilized. This is typically done in advance of fluid processing in order to reduce the chance that unwanted chemicals are introduced into the drug product.

One major problems of using diaphragms in current valves is that the diaphragm can warp and/or become irregular and may not seal properly when the operator manually closes the valve because the diaphragms are exposed to the extreme conditions of the steam sterilization procedure multiple times and because over exertion of pressure from the stem due to over rotating the handle. Because current valve diaphragm designs utilizes a stem with a fixed operation range, obtaining a proper closure seal depends on proper placement of the diaphragm to prevent leakage from the valve due to improper sealing.

Pharmaceutical and biotechnology companies recognize the warping and sealing problems of current diaphragm valves for some time and many have instituted preventative maintenance programs that require regular replacement of diaphragms. Unfortunately, these measures have not provided to be a satisfactory solution because it is not easy to predict when diaphragm warping will occur and typically the problem is detected too late—generally after a biological contamination that resulted from a breach to the sterile barrier. In addition, the success of diaphragm replacement can vary from operator to operator and therefore may require labor intensive leak testing and re-replacement in order to assure no leaks are present for a even new diaphragm.

BRIEF SUMMARY OF THE INVENTION

This invention relates to torque sensitive sanitary diaphragm valves and methods of using torque sensitive sanitary valves in the production of chemical and biological therapeutics to obtain procedural reproducibility in the production pharmaceutical compounds and intermediates related thereto. More specifically, this invention relates to the insertion of pressure sensitive slipping mechanisms in sanitary diaphragm valves between the valve's handle and the valve's stem, between the attachment areas of the valve's handle and the valve's stem or in between the attachment areas of the valve's handle and the valve's stem housing area.

Figure 1A:
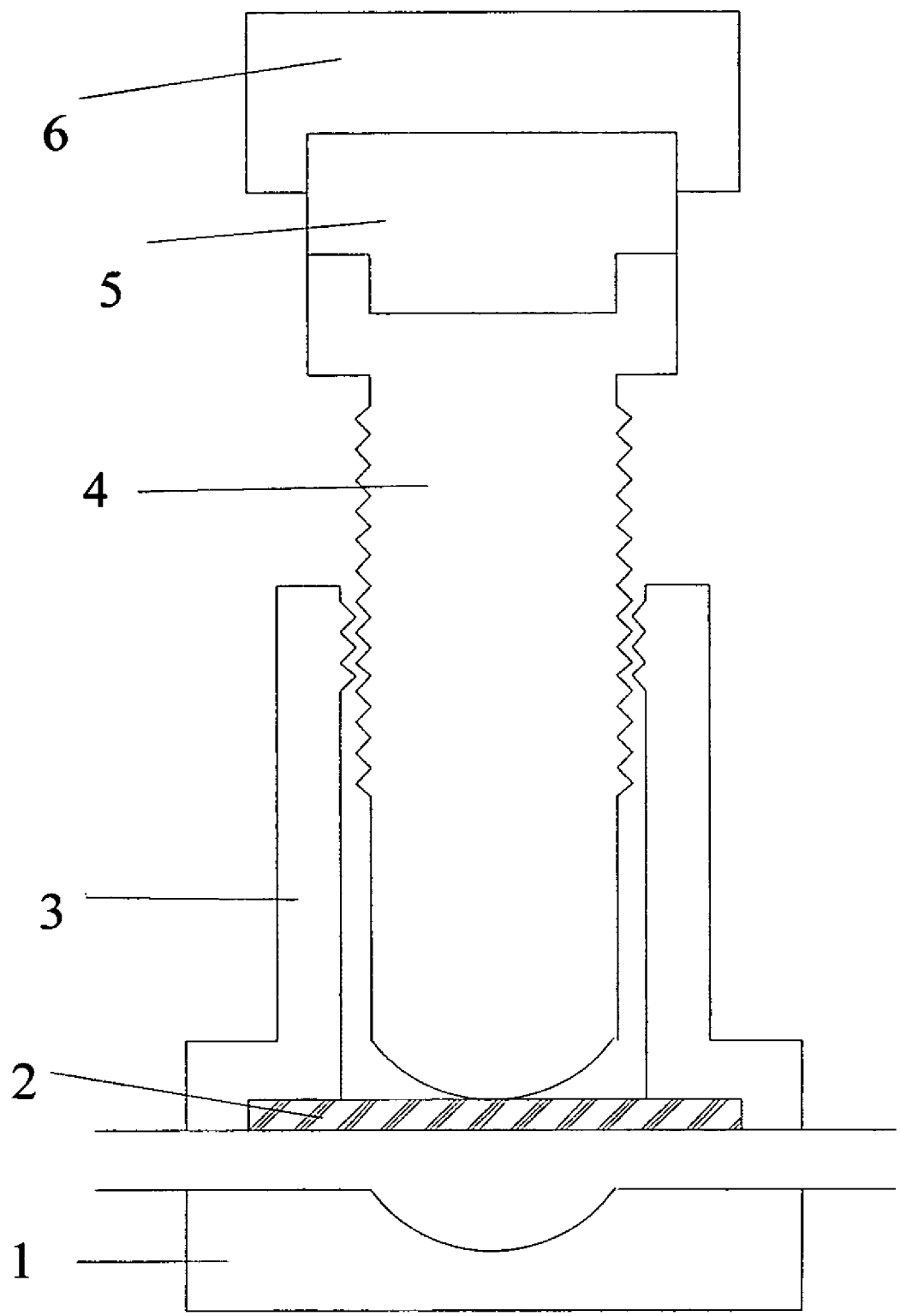
FIG. 1A. In this invention the housing contains a flow housing area (1) and a stem housing area (3). The flow housing area (1) is a location on a pipe, tubing, or other structure utilized to facilitate the flow of solutions between two areas where there is a desired to prevent the flow of the solutions. The stem housing area (3) is a hollow structure, such as a tube, with a first opening attached to the flow housing area and a second opening threaded for the stem. The stem (4) has a top, a middle, and a bottom. The top of the stem is attached to the slipping mechanism (5). The slipping mechanism (5) is attached to the handle (6). The middle of the stem is counter-threaded for the threaded stem housing's attachment area. The bottom of the stem is shaped to mate with the shape of the flow housing area. The diaphragm (2) is a flexible material that has a chemical contact side and a stem contact side. The diaphragm (2) is located in the first opening of the stem housing between the stem and the flow housing area.
Figure 1B:
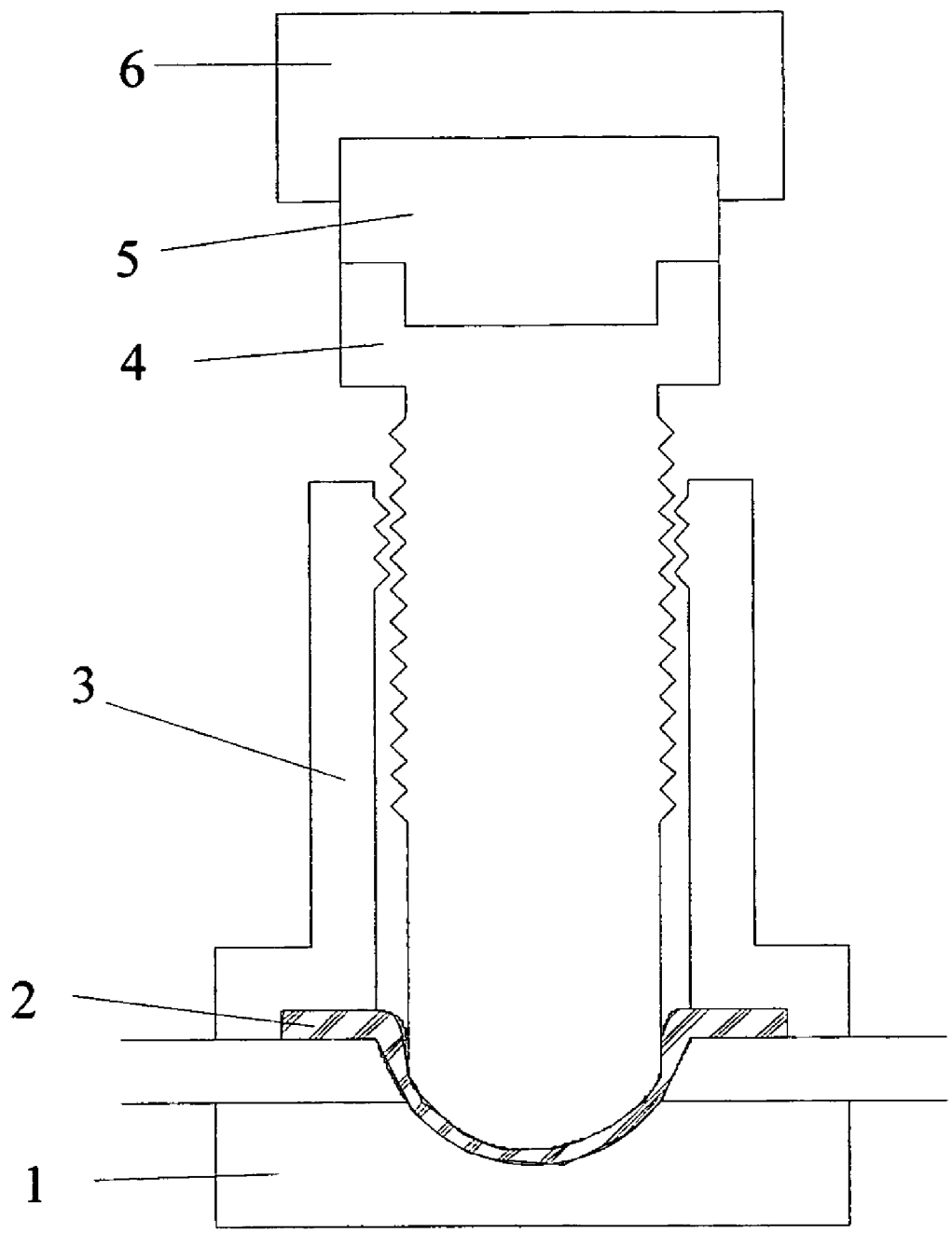
FIG. 1B. Closing the valve is accomplished by rotation of the handle (6) causing the threaded and counter-threaded stem housing's stem attachment area and stem's stem housing attachment area respectively to move the stem (4)

vertically down the stem housing area (3) until the bottom of the stem moves through the first opening of the stem housing into the flow housing area (1). During rotation of the handle, the stem (4) contacts the diaphragm (2) pushing the diaphragm's chemical contact side into the flow housing area (1) ultimately forming a seal with the surrounding flow housing area as the bottom of the stem mates with the flow housing area obstructing the flow of solutions. As diaphragm (2) compresses, the stem will begin to exert pressure on the handle requiring an increase the amount of torque necessary to continue rotating the handle. When a pre-set torque is exerted on the handle, the slipping mechanism (5) will allow the handle to rotate but will not allow the threaded stem housing and counter-threaded stem to further engage preventing the stem from apply additional pressure on the diaphragm.

Figure 2:
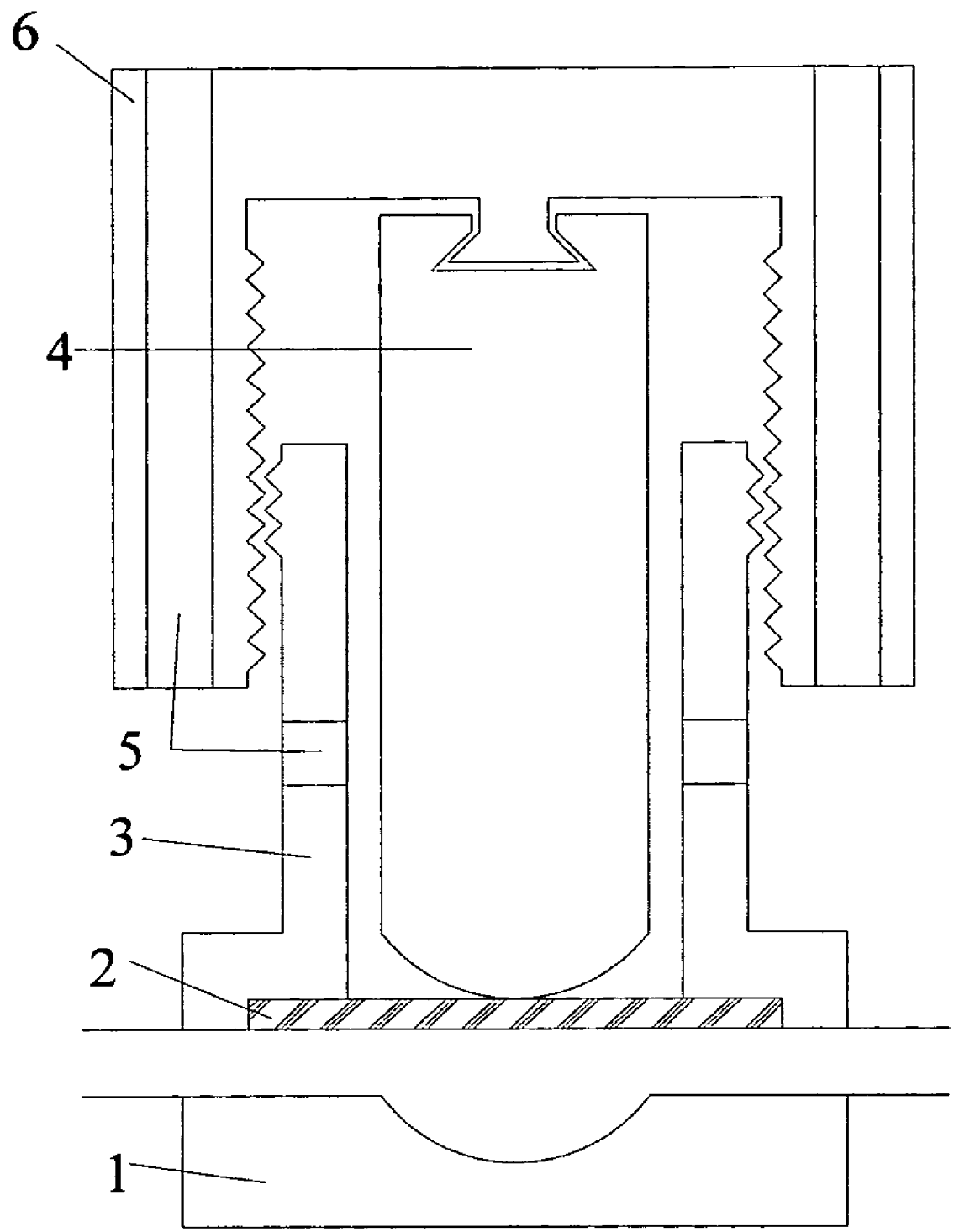

FIG. 2. The stem housing area (3) is a hollow structure, such as a tube, with a first opening attached to the flow housing area, a second opening, and a handle attachment area threaded for attachment of the handle. The stem (4) has a top, a middle, and a bottom. The top of the stem is attached to the handle (6). The stem (4) is attached to the handle (6) in a manner allowing the handle to rotate freely or pivot without rotation of the stem. The middle of the stem is enclosed in the stem housing area. The bottom of the stem is shaped to mate with the shape of the flow housing area (1). The handle (6) contains a counter-threaded stem housing attachment area for attachment to the threaded stem housing's handle attachment area. The diaphragm (2) is a flexible material that has a chemical contact side and a stem contact side. The diaphragm (2) is located in the first opening of the stem housing (3) between the stem (4) and the flow housing area (1). The slipping mechanism (5) is located either between the stem housing and the stem housing's threaded handle attachment area or between the handle and the handle's counter-threaded stem housing attachment area.

Figure 3:
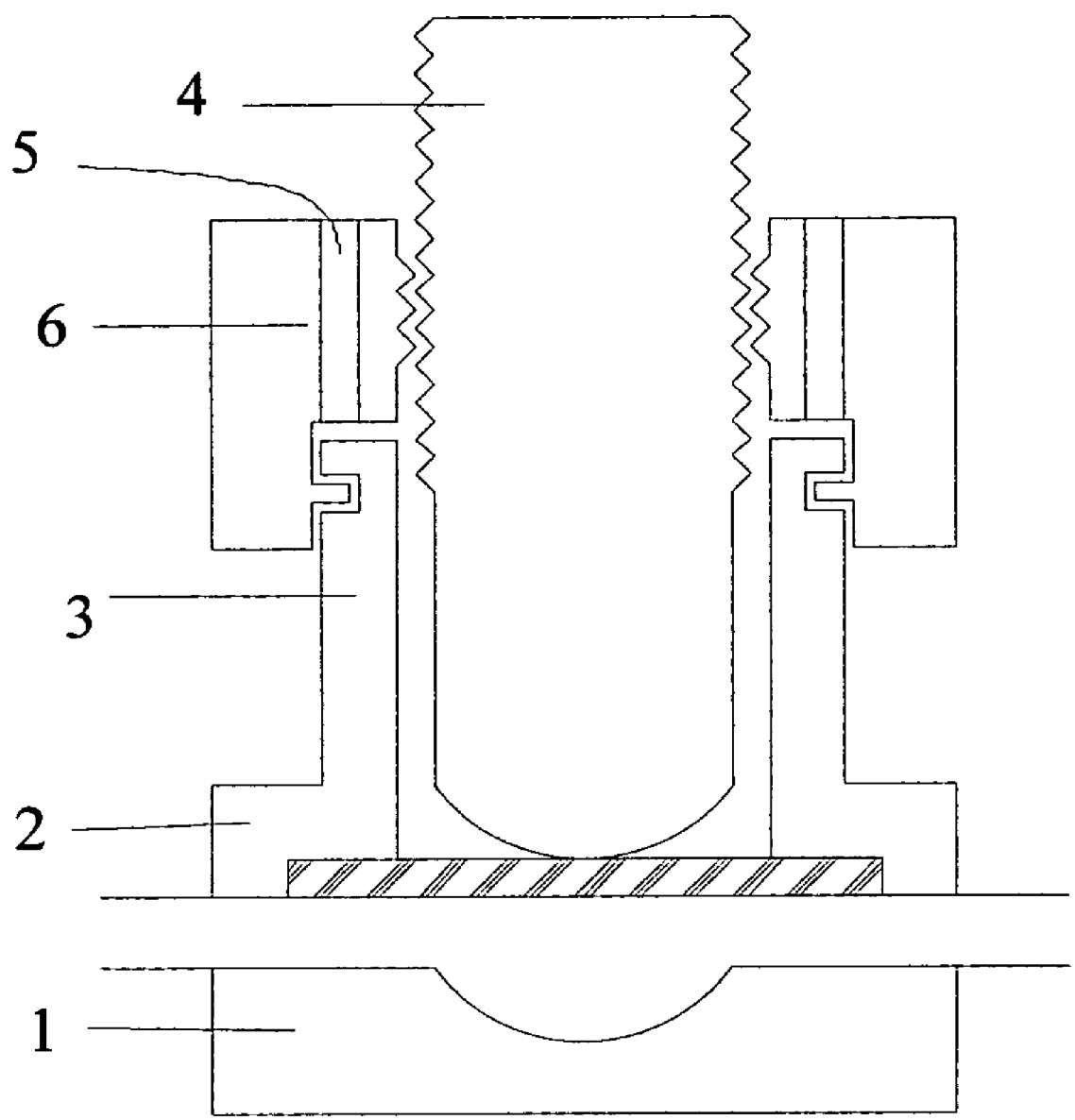

FIG. 3. The stem (4) has a top, a middle, and a bottom. The middle and top of the stem are threaded as an area for attachment of the handle. The bottom of the stem is shaped to mate with the shape of the flow housing area (1). The middle and bottom of the stem is enclosed in the stem housing area (3), and the top of the stem protrudes out through the second stem housing opening. The handle (6) contains a stem housing attachment area and a counter-threaded stem attachment area. The handle (6) is attached to the stem housing (3) in a manner allowing the handle to rotate freely or pivot without rotation of the stem housing. The diaphragm (2) is a flexible material that has a chemical contact side and a stem contact side. The diaphragm (2) is located in the first opening of the stem housing between the stem and the flow housing area. The slipping mechanism (5) is located between the handle (6) and the handle's counter-threaded stem attachment area.

DETAILED DESCRIPTION OF THE INVENTION

The critical feature sanitary diaphragm valve is the pressure obtain when mating the stem bottom, the diaphragm, and the flow area. If the valve diaphragm warps and a valve stem no longer provides proper sealing force when the operator places the valve in the fully closed position, then the valve will leak until it is disassembled and the diaphragm manually adjusted. By expanding the valve stem travel range of operation and modifying the valve handle to "slip" when a pre-set torque is reached, a reproducible seal pressure is achieved resulting in superior cost effective manufacturing capabilities.

Pressure sensitive sanitary diaphragm valves contain five major components: a housing, a stem, a handle, a diaphragm, and a slipping mechanism.

In one example of this invention the housing contains a flow housing area and a stem housing area. The flow housing area is a location on a pipe, tubing, or other structure utilized to facilitate the flow of solutions between two areas where there is a desired to prevent the flow of the solutions. The stem housing area is a hollow structure, such as a tube, with a first opening attached to the flow housing area and a second opening threaded for the stem. The stem has a top, a middle, and a bottom. The top of the stem is attached to a slipping mechanism. The slipping mechanism is attach to the handle. The middle of the stem is counter-threaded for the stem housing's second opening. The bottom of the stem is shaped to mate with the shape of the flow housing area. The diaphragm is a flexible material that has a chemical contact side and a stem contact side. The diaphragm is located in the first opening of the stem housing between the stem and the flow housing area. The slipping mechanism is located between the handle and the stem.

Closing the valve is accomplished by rotation of the handle causing the threaded and counter-threaded stem housing's stem attachment area and stem's stem housing attachment area respectively to move the stem vertically down the stem housing area until the bottom of the stem moves through the first opening of the stem housing into the flow housing area. During rotation of the handle, the stem contacts the diaphragm pushing the diaphragm's chemical contact side into the flow housing area ultimately forming a seal with the surrounding flow housing area as the bottom of the stem mates with the flow housing area obstructing the flow of solutions. As diaphragm compresses, the stem will begin to exert pressure on the handle requiring an increase the amount of torque necessary to continue rotating the handle. When a pre-set torque is exerted on the handle, the slipping mechanism will allow the handle to rotate but will not allow the threaded stem housing and counter-threaded stem to further engage preventing the stem from apply additional pressure on the diaphragm.

Opening the valve is accomplished by counter-rotation of the handle causing the threaded and counter-threaded stem housing's stem attachment area and stem's stem housing attachment area respectively to move the stem vertically up the stem housing area and the bottom of the stem out of the flow housing area back through the first opening of the stem housing into the hollow area of the stem housing.

The slipping mechanism can be created in variety of ways well-know to those skilled in the art. For example, the embodiments of this invention include a slipping mechanism that contains a top and a bottom that engage each other. The top attached to the handle is affixed with a gear, such as a sprocket. The bottom attached to the stem contains a cylinder with flexible strips of metal placed to reside within the notches of the gear and affixed to the inner cylinder. When the torque is sufficient the strips of metal will bend allowing the gear to rotate; thus, creating a "slip" in the handle.

In another example of this invention the housing contains a flow housing area and a stem housing area. The flow housing area is a location on a pipe, tubing, or other structure utilized to facilitate the flow of solutions between two areas where there is a desired to prevent the flow of the solutions. The stem housing area is a hollow structure, such as a tube, with a first opening attached to the flow housing area, a second opening, and a handle attachment area threaded for attachment of the handle. The stem has a top, a middle, and a bottom. The top of the stem is attached to the handle. The stem is attached to the handle in a manner allowing the handle to rotate freely or pivot without rotation of the stem. The middle of the stem is enclosed in the stem housing area. The bottom of the stem is shaped to mate with the shape of the flow housing area. The handle contains a counter-threaded stem housing attachment area for attachment to the threaded stem housing's handle attachment area. The diaphragm is a flexible material that has a chemical contact side and a stem contact side. The diaphragm is located in the first opening of the stem housing between the stem and the flow housing area. The slipping mechanism is located either between the stem housing and the stem housing's threaded handle attachment area or between the handle and the handle's counter-threaded stem housing attachment area.

Closing the valve is accomplished by rotation of the handle causing the threaded and counter-threaded stem housing's handle attachment area and handle's stem housing attachment area respectively to move the stem vertically down the stem housing area until the bottom of the stem moves through the first opening of the stem housing into the flow housing area causing obstruction of the flow of solutions through the flow housing area. During rotation of the handle, the stem contacts the diaphragm pushing the diaphragm's chemical contact side into the flow housing area ultimately forming a seal with the surrounding flow housing area as the bottom of the stem mates with the flow housing area obstructing the flow of solutions. As diaphragm compresses, the stem will begin to exert pressure on the handle requiring an increase the amount of torque necessary to continue rotating the handle. When a pre-set torque is exerted on the handle, the slipping mechanism will allow the handle to rotate but will not allow the threaded stem housing and counter-threaded handle to further engage preventing the stem from apply additional pressure on the diaphragm.

Opening the valve is accomplished by counter-rotation of the handle causing the threaded and counter-threaded stem housing's handle attachment area and handle's stem housing attachment area respectively to move the stem vertically up the stem housing area and the bottom of the stem out of the flow housing area back through the first opening of the stem housing into the hollow area of the stem housing.

In another embodiment of this invention the housing contains a flow housing area and a stem housing area. The stem housing area is a hollow structure, such as a tube, with a first opening attached to the flow housing area, a second opening, and a handle attachment area. The stem has a top, a middle, and a bottom. The middle and top of the stem are threaded as an area for attachment of the handle. The bottom of the stem is shaped to mate with the shape of the flow housing area. The middle and bottom of the stem is enclosed in the stem housing area, and the top of the stem protrudes out through the second stem housing opening. The handle contains a stem housing attachment area and a counter-threaded stem attachment area. The handle is attached to the stem housing in a manner allowing the handle to rotate freely or pivot without rotation of the stem housing. The diaphragm is a flexible material that has a chemical contact side and a stem contact side. The diaphragm is located in the first opening of the stem housing between the stem and the flow housing area. The slipping mechanism is located either between the stem and the stem's threaded handle attachment area or between the handle and the handle's counter-threaded stem attachment area. The closing and opening of the valve is accomplished as described in the previous embodiments.

Another embodiment of this invention is a pharmaceutical valve for use with biological and chemical transfer equipment having a housing with a flowing housing area having a shape for the transfer of a solution through the flow housing area, and a stem housing area having a first opening attached to the flow housing area and a second opening threaded for vertical motion within the stem housing area, the pharmaceutical valve comprising: a stem with a top, a middle counter-threaded for the stem housing's second opening, and a bottom shaped to mate with the shape of the flow housing area; a handle; a diaphragm with a chemical contact side and a stem contact side located in the first opening of the stem housing between the stem and the flow housing area; and a slipping mechanism located between the handle and the stem.

Another embodiment of this invention is a pharmaceutical valve for use with biological and chemical transfer equipment having a housing with a flowing housing area having a shape for the transfer of a solution through the flow housing area, and a stem housing area having a first opening attached to the flow housing area and a second opening threaded for vertical motion within the stem housing area, the pharmaceutical valve comprising: a stem with a top, a middle counter-threaded for the stem housing's second opening, and a bottom shaped to mate with the shape of the flow housing area; a handle counter-threaded for attachment to the stem housing attachment area and affixed to the stem allowing the handle to pivot without rotation of the stem; a diaphragm with a chemical contact side and a stem contact side located in the first opening of the stem housing between the stem and the flow housing area; and a slipping mechanism located either between the stem housing and the stem housing's threaded handle attachment area or between the handle and the handle's counter-threaded stem housing attachment area.

Another embodiment of this invention is a pharmaceutical valve for use with biological and chemical transfer equipment having a housing with a flowing housing area having a shape for the transfer of a solution through the flow housing area, and a stem housing area having a first opening attached to the flow housing area and a second opening having a handle attachment area for vertical motion within the stem housing area, the pharmaceutical valve comprising: a stem with a top and a middle both threaded as an area for attachment of the handle, and a bottom shaped to mate with the shape of the flow housing area; a handle counter-threaded for attachment to the threaded stem's handle attachment area and attached to the stem housing allowing the handle to pivot without rotation of the stem housing; a diaphragm with a chemical contact side and a stem contact side located in the first opening of the stem housing between the stem and the flow housing area; and a slipping mechanism located between the handle and the stem.

Another aspect of this invention are methods of preventing the flow of fluids in equipment making biological or chemical therapeutics using torque sensitive sanitary diaphragm valves according to the embodiments of this disclosure.

The invention claimed is:

1. A torque sensitive sanitary diaphragm valve comprising: (a) a housing having a flow housing area with a shape for the transfer of solution through the flow housing area and a stem housing area with a first opening attached to the flow housing area, a second opening, and a handle attachment area threaded; (b) a stem with a top, a middle enclosed in the stem housing area, and a bottom shaped to mate with the shape of the flow housing area; (c) a handle counter-threaded for attachment to the stem housing attachment area and affixed to the stem allowing the handle to pivot without rotation of the stem; (d) a diaphragm with a chemical contact side and a stem contact side located in the first opening of the stem housing between the stem and the flow housing area; and (e) a slipping mechanism located either between the stem housing and the stem housing's threaded handle attachment area or between the handle and the handle's counter-threaded stem housing attachment area.

2. The method of claim 1, wherein said slipping mechanism comprises a gear and flexible strips of metal placed to reside within notches of said gear.

\* \* \* \* \*